UNITED STATES PATENT OFFICE.

FRANK P. WEST, OF CHICAGO, ILLINOIS.

METALLIC CEMENT.

1,388,011.   Specification of Letters Patent.   Patented Aug. 16, 1921.

No Drawing.   Application filed January 11, 1921.   Serial No. 436,601.

*To all whom it may concern:*

Be it known that I, FRANK P. WEST, a citizen of the United States, residing at 1313 West 103rd St., Chicago, in the county of Cook and State of Illinois, have invented new and useful Improvements in Metallic Cements, of which the following is a specification.

This invention relates to cements used for repairing cracked or broken steam valve casings, pipes, gasolene engine cylinders, and other castings or metal parts.

The cement consists of the following ingredients, combined in the proportions stated, viz:

| | | |
|---|---|---|
| Oxid of iron | 12 | parts by weight. |
| Oxid of zinc | 1 | part by weight. |
| Litharge | 1½ | parts by weight. |
| Aluminum | 4 | parts by weight. |

The aluminum is employed in a finely divided or comminuted state, and the same and the other ingredients stated are thoroughly mixed and made into a paste by the addition of a sufficient quantity of sodium silicate (water glass) dissolved in water to obtain a paste of the desired consistency.

The paste composed of the ingredients stated is thoroughly worked into the crack or over the break to be repaired, and it hardens rapidly and unites perfectly with the metal to which it is applied, the repaired part being strong and durable, and capable of effectively resisting as high a degree of heat and pressure as before.

I claim:

1. A metallic cement composed of oxid of iron, oxid of zinc, litharge, comminuted aluminum and water glass.

2. A metallic cement composed of oxid of iron, oxid of zinc, litharge and comminuted aluminum, made into a plastic mass by the addition of dissolved water glass.

In testimony whereof I affix my signature.

FRANK P. WEST.